(No Model.) 3 Sheets—Sheet 2.

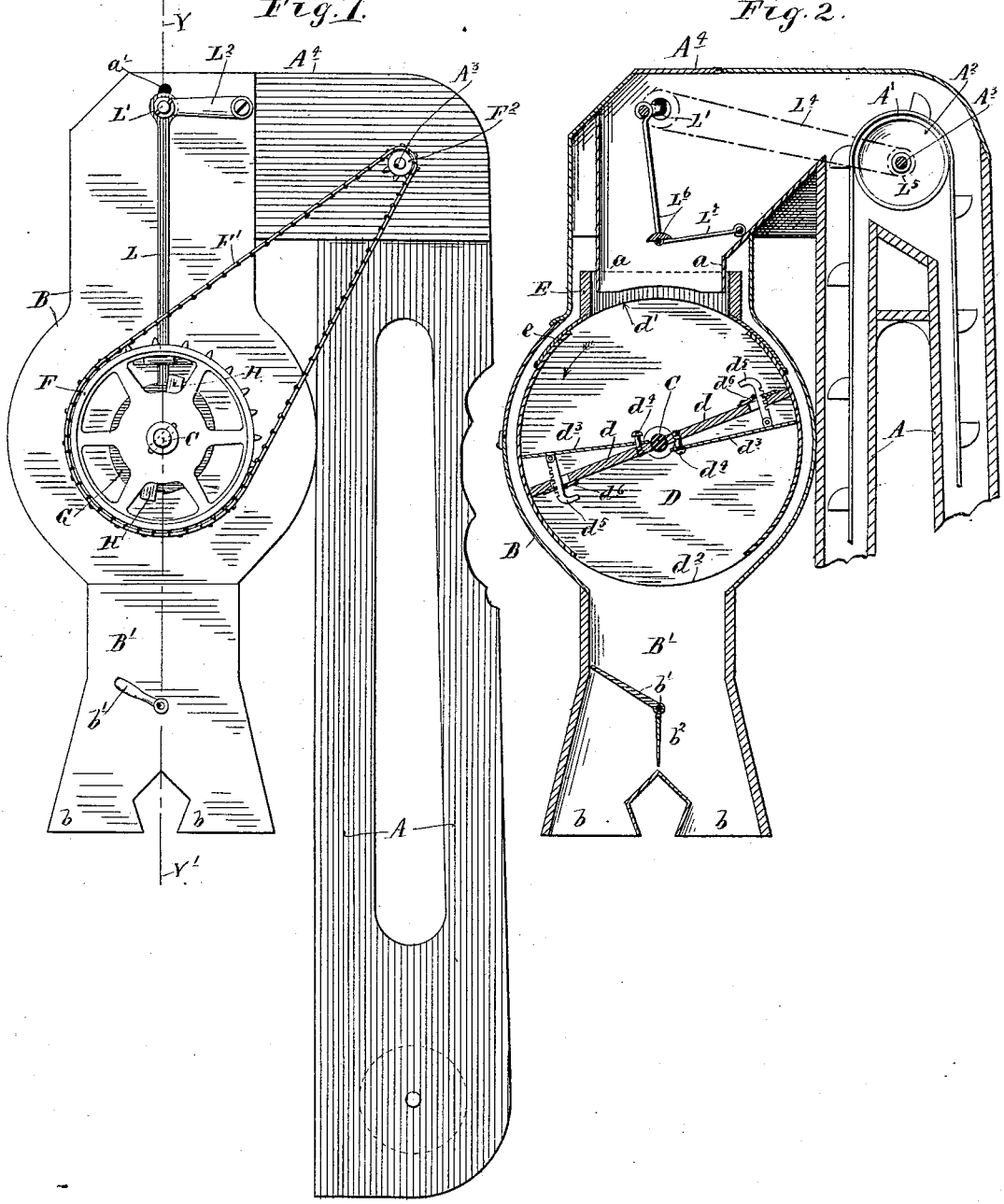

G. ANDERSON.
GRAIN METER.

No. 513,699. Patented Jan. 30, 1894.

Witnesses.
E. F. Elmore
Frank D. Merchant

Inventor.
Gustav Anderson
By his Attorney.
Jas. F. Williamson

THE NATIONAL LITHOGRAPHING COMPANY,
WASHINGTON, D. C.

(No Model.) 3 Sheets—Sheet 3.

G. ANDERSON.
GRAIN METER.

No. 513,699. Patented Jan. 30, 1894.

Witnesses.
E. F. Elmore
Frank D. Merchant

Inventor.
Gustav Anderson
By his Attorney
Jas. F. Williamson

THE NATIONAL LITHOGRAPHING COMPANY,
WASHINGTON, D. C.

UNITED STATES PATENT OFFICE.

GUSTAV ANDERSON, OF MINNEAPOLIS, MINNESOTA.

GRAIN-METER.

SPECIFICATION forming part of Letters Patent No. 513,699, dated January 30, 1894.

Application filed March 3, 1893. Serial No. 464,600. (No model.)

*To all whom it may concern:*

Be it known that I, GUSTAV ANDERSON, a citizen of the United States, residing at Minneapolis, in the county of Hennepin and State of Minnesota, have invented certain new and useful Improvements in Grain-Meters; and I do hereby declare the following to be a full, clear, and exact description of the invention, such as will enable others skilled in the art to which it appertains to make and use the same.

My invention relates to grain-meters; and has for its object to provide an efficient machine of this class, which shall be simple and cheap in construction.

To this end, the invention consists in certain novel devices and combination of devices, which will be hereinafter fully described and be defined in the claims.

My invention was especially designed for use on thrashing machines; and in the accompanying drawings, I have shown the same as applied to the elevator of a thrashing machine separator; but of course, it will be understood, that any other feed or supply spout might be substituted for the delivery spout of the elevator-hood. In other words, my grain meter is applicable generally for measuring grain and similar materials.

Figure 3:
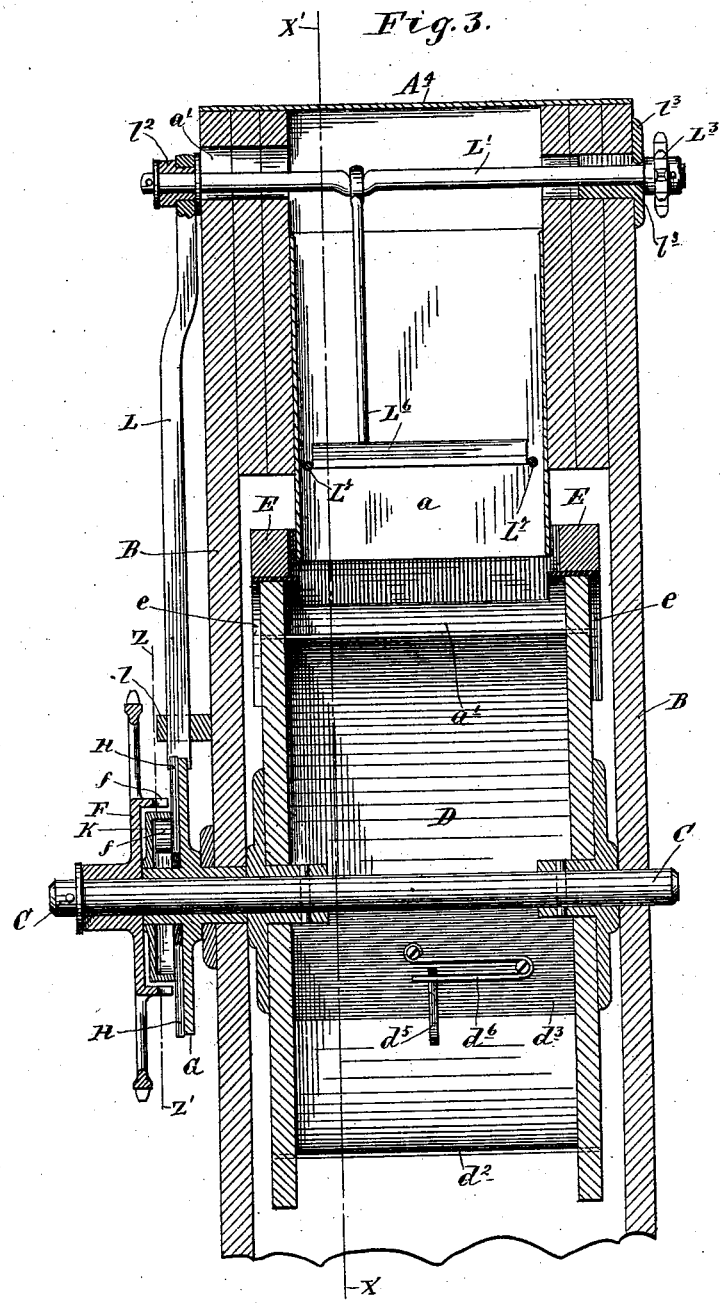
Figure 4:
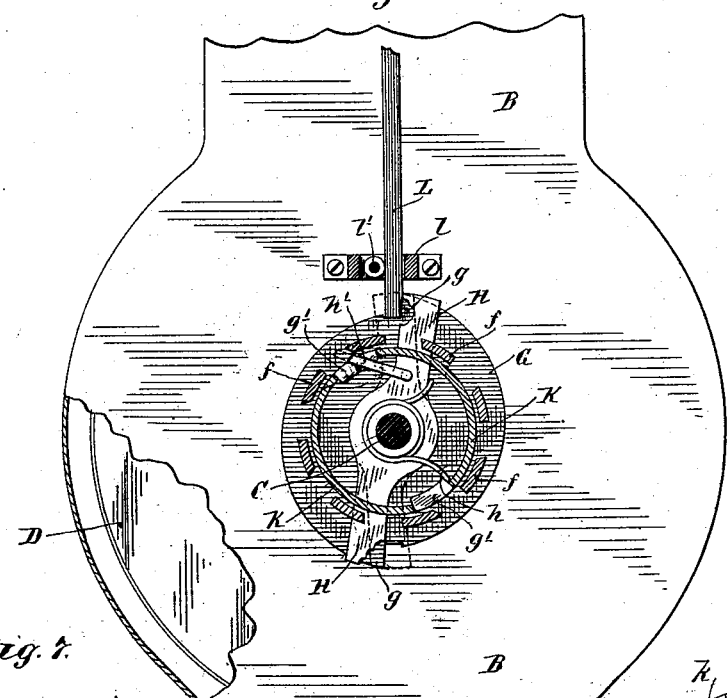
Figure 7:
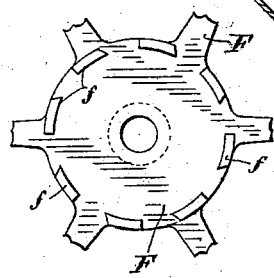
Figure 8:
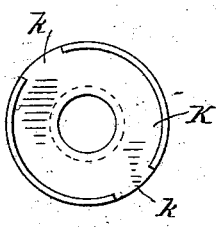
Figure 5:
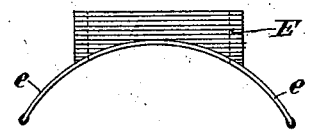
Figure 6:
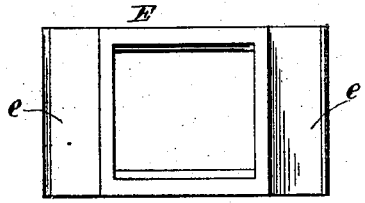

In the accompanying drawings, like letters referring to like parts throughout the several views,—Figure 1 is a front elevation of the elevator and my grain meter detached, some parts being broken away. Fig. 2 is a vertical section of the parts shown in Fig. 1, taken on the line X X' of Fig. 3, some parts being broken away. Fig. 3 is a vertical section, on the line Y Y' of Fig. 1, looking from the right toward the left. Fig. 4 is an enlarged view in front elevation, of some of the parts shown in Fig. 1, some of the parts being broken away and others being shown in section on the line Z Z' of Fig. 3. Figs. 5 and 6 are views in front elevation and plan respectively, of the joint box or joint section of spout, between the feed spout and measuring receptacle, detached. Fig. 7 is an inside view of the loose driving sprocket with clutch-lugs or surfaces; and Fig. 8 is an inside view of the cup-like retaining disk, which works between the sprocket and a cam-disk clutch member, which is rigid with the measuring receptacle.

A is the elevator-trunk, A' the elevator-proper, $A^2$ the elevator driving pulley, $A^3$ the elevator shaft, and $A^4$ the elevator-hood, with the discharge or feed-spout $a$, all of the usual construction.

B is an outside shell or casing enlarged into approximately circular form at its central part, which depends from the elevator hood with a clear space between the same and the feed-spout $a$, and carries at its lower end a bagger B' with divergent discharge chutes or legs $b$, a hand operated shunt-valve $b'$ located above the angle of the discharge legs and with a pivoted drop $b^2$ depending therefrom.

C is a central shaft, journaled in the side plates of the casing B and extending outward through the casing at its front end.

D is the measuring receptacle, which is of drum-like form and is rigidly secured to the shaft C. This receptacle D is divided into two compartments by a central partition $d$, which compartments have mouths or openings $d'$ $d^2$ through the periphery of the drum, for receiving the grain from the feed-spout $a$, in one position of the receptacle, and discharging the same into the bagger B' in another position of the same. The partition $d$ is provided with a pair of take-up devices $d^3$, the inner ends of which are secured with freedom for a slight movement toward and away from the partition $d$, by means of set-screws $d^4$, working through holes in the take-up devices or by any other suitable means. The outer ends of the take-up devices $d^3$, may be secured in any angular adjustment, with respect to the partition, by means of the pivoted arms $d^5$, which work through holes in the partition and are provided with notches which are held in engagement with projecting flanges of the said partition, by means of springs $d^6$.

The dividing partition $d$ of the measuring receptacle D, is so related to the mouths $d'$ $d^2$ of the two compartments, that when either compartment is in its filling position, the partition will stand on a downward pitch, with reference to the movement of the receptacle. This arrangement throws the body of the weight in the filled receptacle to one side of the pivotal center and assists in starting the receptacle on its rotary movement. The fact that the partition thus stands at a downward dip, taken together with the movement, permitted to the take-up devices $d^3$ at their inner ends, permits the take-up devices to clear themselves when either compartment is in its emptying position, of any grain which might work in between the partition and the take-up device.

E is a joint-box or joint section of spout, which loosely rests on the periphery of the measuring receptacle and freely telescopes with the delivery end of the feed spout $a$. This joint section is provided with extended spring-flanges $e$, which rest upon and form a close joint with the periphery of the drum D. The spring flanges $e$ are made of some comparatively stiff yielding and flexible material, such as belt-stock. This joint section E $e$, affords a yielding grain-tight joint between the feed-spout and the measuring receptacle, which permits the free rotary movement of the receptacle, even if the same be irregular or not exactly centered, without permitting any escape of the grain. This joint section, I regard as one of the most important features of my invention, as it makes practical the rotary measuring receptacle. Hitherto it has been impossible to secure satisfactory results with a rotary receptacle, receiving directly from the feed spout, on account of the difficulty experienced in the attempts to secure a grain-tight joint between the feed-spout and receptacle, which would, at the same time, permit the necessary freedom of movement to the receptacle. The joint section E $e$ above described, will do the work, as I have demonstrated by actual usage.

Referring now to the automatic action of the measuring receptacle, F is a sprocket wheel, which is loosely mounted on the front end of the central shaft C, and is kept in constant motion by a chain F', passing over a small sprocket $F^2$ on the front end of the elevator driving shaft $A^3$. The loose sprocket F has on its inner face projecting clutch lugs $f$, for a purpose which will presently appear.

G is a cam-disk with an extended hub, which is keyed or otherwise made fast to the shaft C. The cam-disk G, has two shoulders $g$, at opposite points of its periphery, and is provided on its outer face with a pair of projecting lugs $g'$.

H is a pivoted clutch member or clutch-lock, which is loosely mounted on the hub of the cam-disk G, and is under tension to turn thereon from a spring $h$. The member H works between and is limited in its pivotal movements by the lugs $g'$, projecting from the face of the cam-disk G, and carries a clutch finger $h'$, which works through a seat, in the form of a notch or perforation in one of the lugs $g'$, the projecting end of which finger is adapted to be thrown into the path of and be engaged by the clutch-lugs $f$ on the inner face of the loose sprocket F. The clutch or lock-member H is held in its working position, and is properly spaced apart from the loose sprocket F, by the cup-shaped retaining disk K, which is loosely seated on the outer hub of the fixed cam disk G, with its flange bearing against the face of the member H, and held in position by the lugs $g'$, which engage with notches $k$, cut in the said flange. Normally, the clutch or lock-member H, is held in its idle position against the tension of its spring $h$, by a depending trip-bar or rod L, working through a guide-keeper $l$, on the face of the casing B, with its lower end engaged by one of the shoulders $g$ of the cam-disk G, and by one end of the said clutch-member H. For ease in its sliding movement, the lower end of the trip L may be held in its proper working position within the keeper $l$, by an anti-friction roller $l'$. The trip-bar L is carried by a packer shaft L', from the front end of the same, which works through a vertical slot $a'$ in the elevator hood and the casing, and is provided with a bearing-box $l^2$, seated in the upper end of the trip-bar, and carried by an arm $L^2$ pivoted to the front plate of the casing. At its rear end, the packer shaft L' is seated in an open box $l^3$ constructed with a bridge adapted to hold the rear end of the shaft from vertical movement, while permitting the shaft to pivot thereon and move up and down, when necessary, in the slot $a'$ at its forward end. The shaft L' is kept in constant motion by a sprocket $L^3$ and a chain $L^4$, shown in dotted lines in Fig. 2, passing over a sprocket $L^5$ on the rear end of the elevator driving shaft $A^3$. The packer shaft L' is formed with a crank-portion from which depends a packer $L^6$, which is pivotally connected at its lower end by a link $L^7$, to the inner wall of the feed-spout or elevator-hood. The part $L^7$ is preferably of bail-like form.

The operation is as follows:—Supposing the parts to be in the position, as shown in Figs. 1, 2, 3 and 4 of the drawings, the grain will be supplied, by the elevator and the feed-spout to the upper compartment of the rotary receptacle D, through the mouth $d'$. When the compartment is filled and the grain backs up into the feed-spout $a$, the packer $L^6$ will come in contact therewith, thereby raising the front end of the shaft L', and lifting the trip-bar L, away from the cam-disk G and the end of the clutch member H. This allows the said clutch member to move under the tension of its spring $h$, thereby throwing outward its clutch finger $h'$, into the path of the clutch-lugs $f$ on the inner face of the constantly running sprocket F. Hence, the drum will be turned with the said sprocket, through a half revolution, during which time, the lower end of the trip-bar L will ride on the periphery of the cam-disk G. At the end of the half revolution, the opposite shoulder $g$ of the cam-disk G and the opposite end of the clutch member H will come in contact with the lower end of the trip-bar, thereby retracting the clutch finger $h'$ out of the path of the sprocket-wheel-lugs $f$, and intercepting and stopping the cam-disk and the rotary receptacle D.

These actions are repeated every time that either compartment is filled. When in its emptying position, each compartment of the rotary receptacle D discharges, as shown, into the bagger B. This bagger B, however, may be entirely dispensed with, and the discharge be made from the measuring receptacle directly into a wagon-box or other receptacle. The said bagger is of a special construction which is of my invention, and is claimed in a companion case filed of even date herewith, entitled "grain bagger."

What I claim, and desire to secure by Letters Patent of the United States, is as follows:

1. In a grain-meter, the combination with a feed-spout and a movable measuring receptacle receiving therefrom, of a loose joint box or section of spout, freely telescoping with the delivery end of said feed-spout and bearing against the said receptacle, for affording a yielding grain-tight joint between the said spout and receptacle, substantially as described.

2. In a grain-meter, the combination with a feed-spout and a movable measuring receptacle receiving therefrom, of a loose joint box or section of spout freely telescoping with the delivery end of said feed-spout, and provided with extended spring flanges bearing against said receptacle, substantially as and for the purpose set forth.

3. In a grain-meter, the combination with a feed-spout and a rotary drum-like measuring receptacle with open mouthed compartments receiving directly from said spout, of a loose joint section freely telescoping with the delivery end of said feed-spout and provided with extended flanges or flaps of comparatively stiff yielding and flexible material, such as belt-stock, bearing against the periphery of the said drum, substantially as and for the purposes set forth.

4. In a grain-meter, a rotary measuring receptacle divided into compartments and provided with take-up devices carried by the dividing partition, angularly movable with respect to said partition at their outer end, and secured thereto at their inner ends with freedom for a limited movement toward and away from the said partition, whereby any grain accumulating between the partition and the take-up devices will escape when the compartments are in their emptying positions, substantially as described.

5. In a grain-meter, the combination with the feed-spout, of the central shaft C, the rotary measuring receptacle D secured to said shaft, the constantly running sprocket F loose on said shaft and provided with the clutch-lugs $f$, the cam-disk G rigid with said shaft, the clutch or locking member H, pivoted on the hub of the said cam-disk and under tension to turn thereon into its locking position, and provided with the clutch-finger $h'$, the pivoted packer-shaft L', with depending reciprocating packer, working in said feed-spout and the trip-bar L carried by the swinging end of said shaft, and normally engaging with a shoulder of the cam-disk G and one end of the clutch-member H, and releasable therefrom upon the accumulation of grain in the said feed-spout from the filled receptacle, substantially as described.

In testimony whereof I affix my signature in presence of two witnesses.

GUSTAV ANDERSON.

Witnesses:
JAS. F. WILLIAMSON,
E. F. ELMORE.